United States Patent [19]

LoCascio

[11] Patent Number: 5,163,088
[45] Date of Patent: Nov. 10, 1992

[54] FACSIMILE SECURITY SYSTEM

[76] Inventor: Peter LoCascio, 50 Belton Rd., Babylon, N.Y. 11702

[21] Appl. No.: 665,240

[22] Filed: Mar. 8, 1991

[51] Int. Cl.⁵ .................. H04M 11/00; H04N 1/32
[52] U.S. Cl. .................... 379/95; 379/100; 358/403; 358/442; 358/468; 358/444; 380/18
[58] Field of Search .............. 380/18; 358/400, 402, 358/403, 442, 444, 468, 404, 407, 405; 379/93, 95, 100

[56] References Cited

U.S. PATENT DOCUMENTS

| | | | |
|---|---|---|---|
| 4,432,020 | 2/1984 | Onose et al. | 379/100 |
| 4,870,678 | 9/1989 | Adachi | 379/100 |
| 4,910,506 | 3/1990 | Yoshida et al. | 358/400 |
| 4,935,955 | 6/1990 | Neudorfer | 379/100 |
| 4,960,981 | 10/1990 | Benton et al. | |
| 4,964,154 | 10/1990 | Shimotono | 379/100 |
| 4,974,254 | 11/1990 | Perine et al. | 379/100 |
| 4,989,238 | 1/1991 | Iggulden et al. | 379/100 |
| 4,994,926 | 2/1991 | Gordon et al. | 358/400 |

OTHER PUBLICATIONS

Filenet Workflo Brochure, undated.
Filenet Magazine, undated, pp. 1-9, 11-24.

Primary Examiner—James L. Dwyer
Assistant Examiner—Wing F. Chan
Attorney, Agent, or Firm—William J. Sapone

[57] ABSTRACT

A facsimile and data security system is disclosed which provides security for all facsimile and data transmissions to prevent loss of information by delaying for review by security personnel selected facsimile and data transmissions. The system is configured for recording all transmitted information onto a Write Once Road many (WORM) storage system to assure the integrity of the information. The system allows management or security personnel to review all transmissions to assure than no confidential information is lost. Means are also provided to utilize the storage system for archiving all documents which are recorded onto the WORM disk by using local scanning stations, eliminating filling cabinets or other filing means while insuring integrity and security of the file documents. The facsimile and data security system optionally provides a virus check on all transmissions and has expandable memory storage to provide essentially unlimited storage to reduce the cost of maintaining paper files. Thus, the facsimile security system provides total security for confidential documents and prevents loss by fire or theft as the storage disks can be duplicated and removed to a depository for preservation.

16 Claims, 3 Drawing Sheets

FACSIMILE SECURITY SYSTEM

TECHNICAL FIELD

This invention is related to facsimile and data transmission and reception systems and more particularly to a system for interception and archiving of all facsimile documents and transmitted data, with means to limit access and transmission of sensitive information. Archiving of all office documents via inter-office telephone connections is also described.

BACKGROUND

Facsimile machines have become a standard office device and an efficient means to insure rapid document transmission. With the increased utilization of facsimile machines has come the potential for loss of confidential information by facsimile transmission without a document ever leaving the premises. Not only intentional thefts, but also unintentional losses may occur as sensitive documents are misdirected, misplaced or viewed by persons who have access to the facsimile machine but who are not cleared to have access to the information.

One solution is to provide a dedicated facsimile machine at each sensitive location with a code access for transmission and reception. Not only does this increase office complexity and cost, it is not effective as access codes quickly become known within an office.

Data transmission and document loss may occur through telephone lines connected to modems. With increased computer use, confidential data can be sent from local computer work stations which are connected to internal or external modems. It is also possible for hackers to access a facilities computer system via these modems, and withdraw or modify important data. There is presently no acceptable security system to inform management of the information being transmitted, or of unauthorized access.

In U.S. Pat. No. 4,935,955, a facsimile PBX is disclosed which provides for automatic roll-over telephone lines to avoid busy signals on the fax transmission lines. Memory storage is provided to capture the facsimile pending machine availability, to make the system seem transparent to outside senders, as all the in-coming facsimiles machines dial the same main phone number.

In U.S. Pat. No. 4,989,238, a facsimile record and playback system is disclosed which allows recording facsimile massages on a cassette tape for later playback or viewing.

Neither of these systems provides security of all facsimile and data transmissions to prevent loss of confidential information, by allowing management review prior to transmission, nor do they provide for archiving of all facsimile documents to maintain a complete record of all transmissions and receptions. At best one can obtain an activity report, but this does not identify the information transmitted. Consequently, the search continues for a low cost yet efficient means for assuring facsimile and data security.

SUMMARY OF INVENTION

It is an object of the present invention to provide a facsimile security system for delaying transmission of selected facsimile documents pending clearance by authorized personnel.

It is a further object to provide a facsimile security system which archives all facsimile documents in a central location to provide a means for reviewing all information entering or leaving via a facsimile machine or similar device.

It is a further object to provide a facsimile security system which captures and stores copies of all data transmissions into or out of a facility which occur via modem.

It is a further object to provide a facsimile security system which is interactive with an existing telephone network to provide means for archiving all documents at a central location using the telephone network or data lines.

It is a further object to provide a facsimile security system which may be interconnected with a plurality of local scanning stations to provide paperless filing of all documents.

These and other objects of the present invention are achieved by providing a facsimile security system comprising interface means disposed at a main telephone line junction, having means for communicating via the telephone lines with external and internal facsimile receive and transmit devices and data transmission devices. The interface means have means for copying all documents and data passing thorough the interface means to a storage device. The interface means also has means for delaying transmission of selected documents or data pending review and approval by a system monitor. A security station is provided for viewing and approving transmission/reception of any in-coming or out-going facsimile documents, with the security station connected to the interface means via existing telephone lines or data lines. The security system has means for configuring the interface means, to designate document sources for transmission approval, for searching the stored documents and for configuring approval authority. The facsimile security system also has means for continuing transmission of the facsimile documents or data once approval is granted.

DETAILED DESCRIPTION OF THE INVENTION

Figure 1:
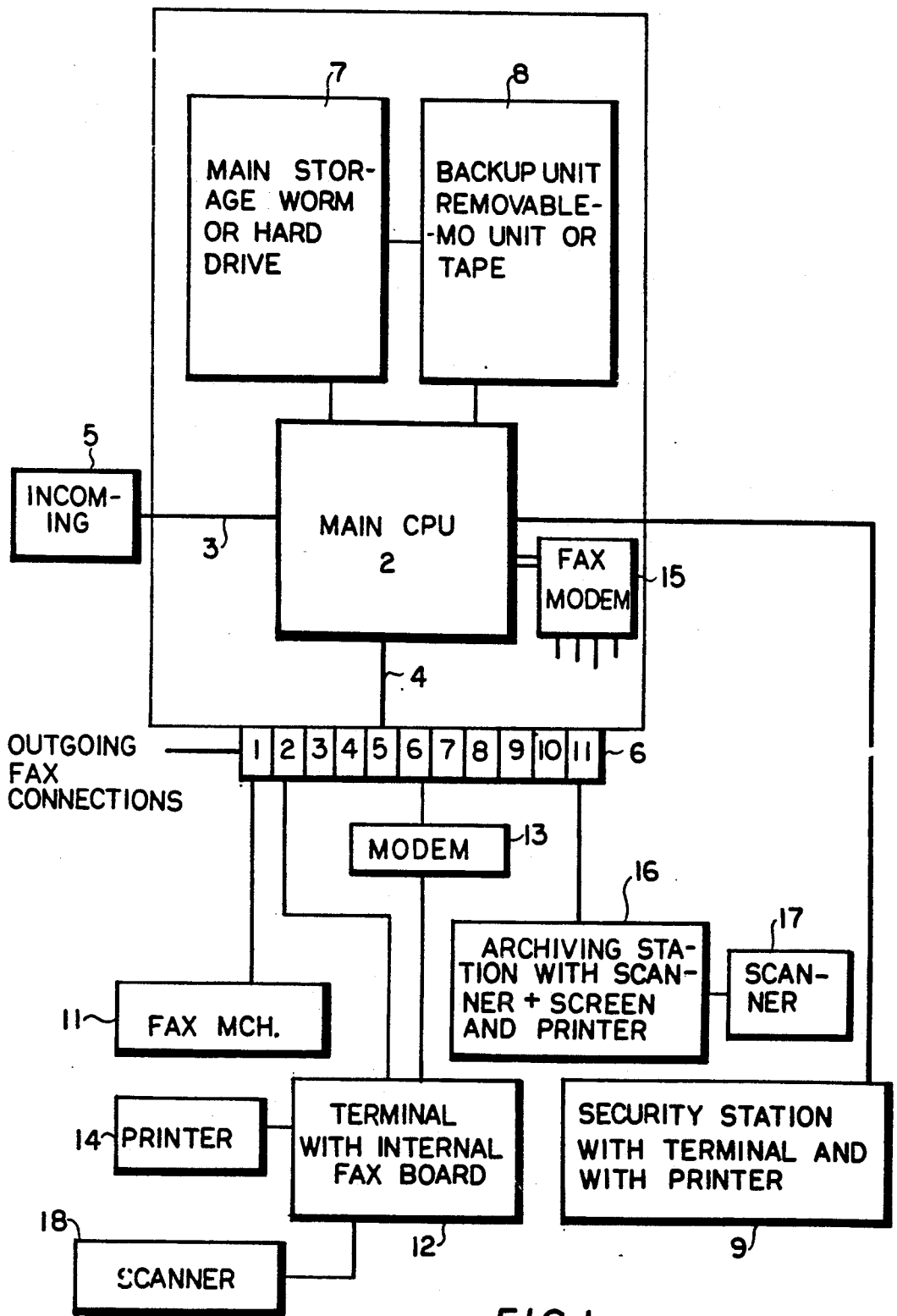
FIG. 1 shows in block diagram form the facsimile security system of the present invention.

Referring to FIG. 1, the facsimile security system of the present invention is shown in block diagram form. The system 1 has a main computer processing unit (CPU) 2 acting as an interface means. The CPU is preferably a host computer and is capable of functioning as the system manager. The CPU is configured for integration with any operating system, such as MS-DOS, Unix or Xenix. The CPU is integrated with the existing office telephone network and is compatible with whichever system is used, such as the Novell, DNA, or MS net system. As shown in the FIG. 1, the CPU 2 is connected via telephone lines 3 and 4 between the input/output telephone termination panel 5 and the internal distribution network panel 6. Preferably, the CPU is capable of handling multi-user inputs and outputs to provide rapid processing without delays. While eleven input sources are shown, this is purely illustrative and, depending on the CPU unit chosen, the unit may be configured for one or several hundred users. Using a CPU as the interface has an additional advantage of translating facsimile transmissions to a form which allows high speed transmission to reduce transmission time and costs for using the system.

The CPU unit 2 is integrated with the existing telephone network and is connected to those telephone lines designated as fax or data transmission lines. Thus, all facsimile or data lines must pass through the CPU unit before being sent or received. Similarly all connections to internal facsimile machines or other transmission, reception or data transmission devices which utilize the telephone network must pass through the CPU 2 prior to transmission or reception. The CPU is preferably a multi tasking/multi user device to handle multiple operations. A 386 or 486 computer is preferred.

For purposes of this disclosure, the terms "documents" and "data" refer to all information transmittable over data lines such as a local area network and over telephone lines in machine readable form, such as facsimile transmissions. Thus, the terms are used interchangeably without limitation.

The CPU is configured to delay transmission of selected documents to comply with security restrictions. The configuration may vary such that every document sent or received from any source is held, or, all documents sent or to be received by key personnel are held, or only documents being sent are held, or all documents sent or received from designate sources are held, such as, for example, all documents sent to or from a legal department. The CPU may be configured with search software to flag keywords, specific transmission, line numbers, file numbers etc. to assure that critical documents are identified prior to transmission. In addition, documents may contain a code readable by the CPU as designating a certain security level. The level of security can be tailored to particular needs. Regardless of the delay system used, every document and every data transmission sent or received is copied to allow random checking and tracing of all information entering or leaving the facility.

The CPU 2 is connected to a main storage device 7 which preferably consists of an optical storage device such as a Write Once, Read Many(WORM) disk or another non-writable storage device which does not allow any document modifications. This assures the integrity and accuracy of the facsimile and data recording system and allows viewing by security or management personnel to assure that no documents or data were transmitted that should not have been.

One typical main storage device useable with this invention is the Panasonic-LF-5010 Optical disc drive which can be supplemented to provide up to 36 gigabites of storage. Any document can be retrieved from the storage disk and viewed on a terminal screen or directed to a printer to obtain a hard copy.

A backup storage device 8 is provided to support the main memory storage. This may be a hard disk or other storage device which makes an immediate backup of every document recorded into the main storage memory. Thus, if there is a malfunction in the CPU 2 or the main storage device 7, the information may still be found on the backup device 8. Thus, no information is lost and any document held by the system can be restored from the backup. This allows continued system operation while the storage device 7 is being repaired. The device 8 is preferably erasable so that it can be written over many times and thus avoid the cost of replacement. However, it is preferred that overwriting only be initiated by command of a system manager to prevent inadvertent destruction of stored documents. Essentially any type of memory storage device could be used as the backup device depending on system complexity, size and configuration parameters.

Figure 2:
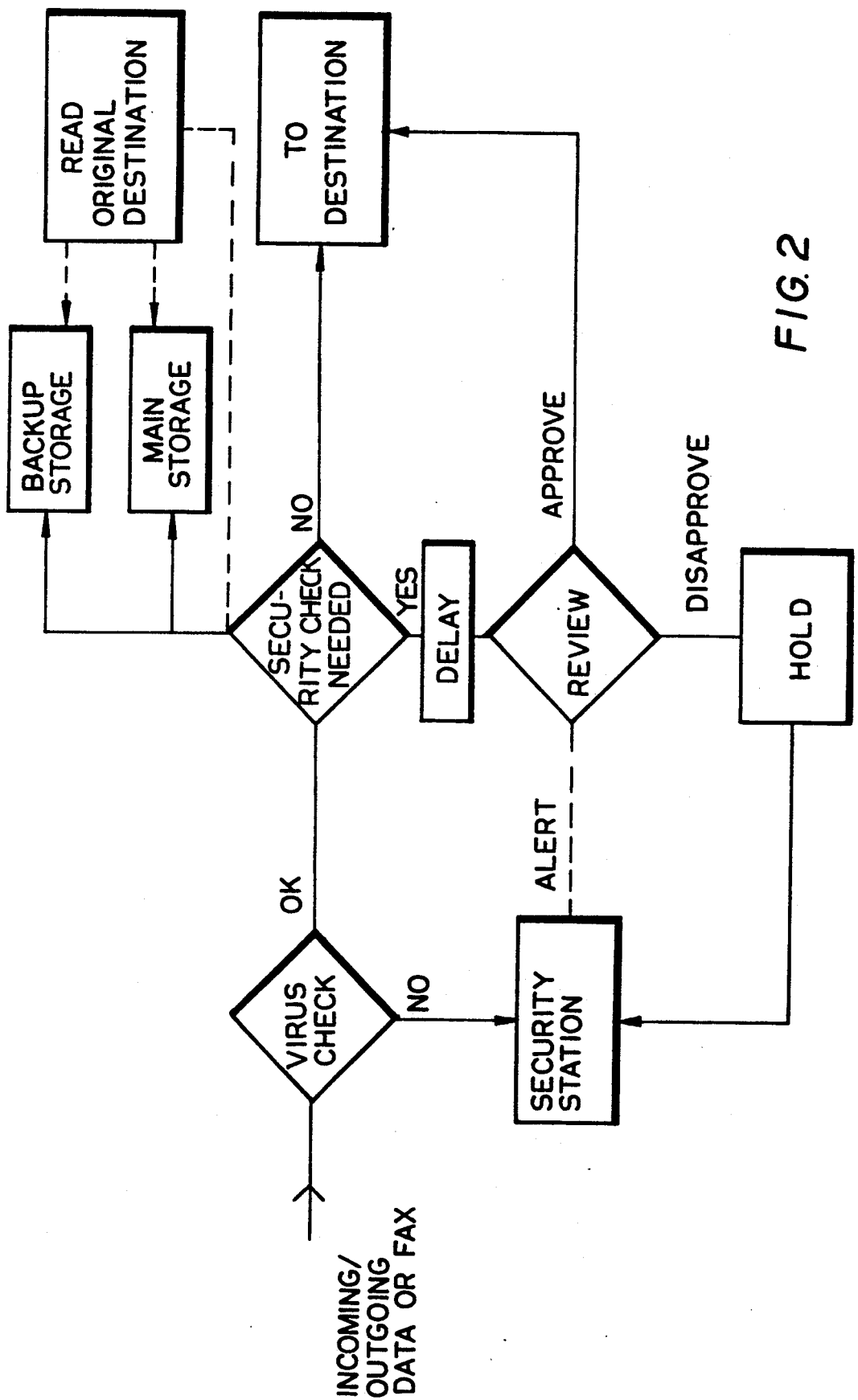
FIG. 2 is a logic flow chart for in-coming and out-going data and document transmissions.

A security station 9 is connected to the CPU 2 by data line 10. The security station provides direct access to all documents and data that are in-process as well as all documents and data stored in main storage 7. The person manning the security station has the ability to approve or disapprove of the transmission or reception of any document. Preferability, selected documents, as configured by the CPU via the security station, sends an alarm to the security station operator to provide rapid review and approval. The station and CPU can also be configured to alarm when transmission during off hours and on weekends are detected, and allows documents and data from particular units within a company to be screened prior to transmission. This has a particular advantage for example in a unit concerned with classified documents or confidential research data. FIG. 2 shows a logic flow chart of the security system.

The security station 9 would comprise a terminal interconnected with the CPU 2 and have access to all documents and data on the main storage device 7 and the backup storage device 8. This station would also be the only access to the CPU for configuration and programming, for example, programming a search strategy within the CPU to highlight documents and data coming from or going to particular units within the company which are deemed sensitive. For those documents which are going from other less sensitive units, these can be checked on a random basis rather than having every document approved prior to transmission or reception. With the provision for storage of all documents, tracking of any inadvertently transmitted documents can be determined immediately.

Additionally, the interface means can be configured from the security station to scan all in-coming and out-going facsimile's and data for viruses, and to purge any such virus prior to transmission. A virus indicating signal can be sent to the security station to alert security as to the source of the virus. By having a centralized security interface system, corporate data, documents and operating systems are protected from external and internal virus sources.

In addition to a security station, individual management stations located in individual units within the company may be used to provide management supervision of that units in-coming and out-going facsimile and data transmissions. However, these management stations would no be able to reconfigure the CPU.

The facsimile security system interfaces with any facsimile machine 11, standard computer work station 12 which may use a desk top PC having either an internal or external dedicated modem 13 and/or a fax board which is tied into the telephone system panel 6 for transmission and reception of facsimiles. This allows a person to use their local computer 12 and printer 14 for transmission and reception of facsimiles or modem transferred information without losing the capability for a security check on information entering or leaving the facility.

Optionally, the CPU 2 has an internal fax modem device 15 which accepts data transmissions from local computer work stations which do not have facsimile boards or modems, and performs this task centrally.

This reduces network complexity and the need for dedicated telephone lines at the local work stations. With a multi-user system, this provides substantial savings in hardware and software as the single fax modem device 15 services multi-users. This also enhances security by limiting the ability to by pass the CPU by using the non-modem or facsimile telephone lines.

Recently office network systems have been developed which rely on radio or infra red transceivers to eliminate hard wiring of each unit. Where such a network is used, the CPU may be equipped with a transceiver to monitor and record such transmissions. Again, the security station and CPU can be configured to provide selective or random review of these transmissions, with all information stored on the main storage device.

The facsimile security system can be provided with sufficient main storage capacity to provide convenient archiving of all office documents. This is achieved by having one or more local archiving stations 16 equipped with optical scanners 17 which allow all documents or papers that are normally filed in conventional filing areas to be scanned and stored on the main storage device 7 which is preferably a WORM disk. This eliminates the need to use outside warehouses for file storage. By loading such documents on a WORM system, integrity is assured as the documents will not be changed over time, and they cannot be manipulated. Additionally, a scanner 18 can be integrated with the PC work station 12 to provide additional access for archiving.

Any document stored in the main storage device 7 can be coded to limit access, if necessary, and to provide logging of all persons who view or copy that document. These documents are retrievable to local terminals and may be directed to a printer. The document could also be sent directly to an internal or external fax machine. The stored documents can be set up for keyword retrieval, by file number, customer name, originator, etc.

Figure 3:
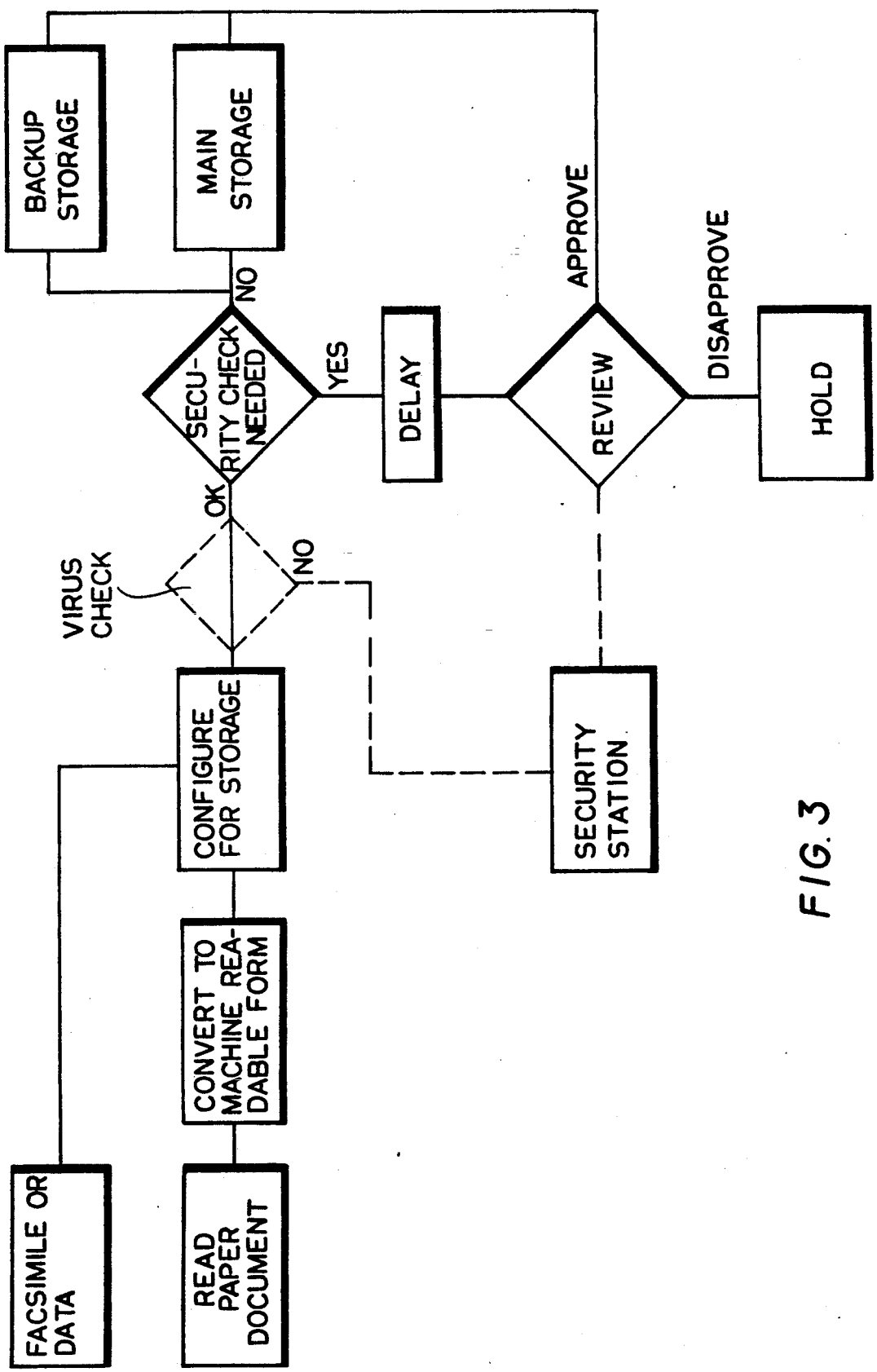
FIG. 3 is a logic flow chart for archiving data and documents.

FIG. 3 shows a logical flow chart of the archiving system. All files can be maintained or backed up by the main storage device which is quite small compared to standard files without creating difficulties in retrieval. In fact, the ability to retrieve documents is substantially enhanced as they are accessible directly to the local desk top computers. There is no need to have entire paper files pulled from storage to locate a single document. Such documents additionally are subjected to the security screening system to limit access and avoid the potential for improper tampering with the filed documents. Once coded for limited access, it would be virtually impossible for such documents to be retrieved inadvertently, lost or destroyed.

An additional advantage of the present invention is that all the interconnections with the main CPU interface utilize existing telephone transmission or data lines for interconnecting the entire system.

The entire interface and storage means could be provided in a single unit having a size of about 3' by 3' by ½' and weighing about one hundred pounds. Such a system could easily be moved and reinstalled at a new location if necessary. Despite its small size, the system provides total unlimited storage for all types of documents in addition to the facsimile documents and data transmissions which are automatically stored. This reduces the need for filing cabinet storage, the expense of microfilming, and insures document integrity. This provides true security while eliminating the potential for lost documents.

Total security against both theft of confidential information and loss of documents through fire or theft are totally eliminated. The storage disks are easily removed periodically from the main storage and placed in a depository, vault or other secure area. The size of the disks, 6" by 6" by 1/16" and containing 6.6 gigabytes of information makes storage costs insignificant, and allows duplication for redundant storage without increasing storage costs. Expendability of the storage system is relatively inexpensive as a new optical disk for the main storage device can be installed at low cost, approximately $100–$200. Such disks have an average rated life of 10 years and would require a two ton magnet to modify the data content, which would totally distort all data on a standard hard disk or tape backup. Additionally, the optical drive head are impervious to x-rays and have a shock rating of 40 g's which is substantially higher than the rating for a standard hard drive. Extensive use of the telephone lines allows ease of system installation while providing substantial benefits in terms of security and archiving capability.

While preferred embodiments have been described relative to particular devices usable with the present invention, it will be understood by those skilled in the art that various modifications can be made without varying from the scope of the present invention. For example, while facsimile machines are typically used to transmit documents, facsimile cards disposed in local personal computers and optical scanners which convert to a facsimile language, may be substitute for the facsimile machines.

I claim:

1. A facsimile and data security system comprising:
    interface means disposed at a telephone line junction, the junction being the interconnecting point where all facsimile and data transmissions to be monitored are sent or received, the interface means disposed between a first terminal panel which connects with the external telephone and data transmission lines and a second termination panel which connects with the internal telephone and data transmission lines, the interface means being configured for monitoring communication between external and internal facsimile and data receipt and transmission devices and data communication passing therethrough, and being configured for delaying transmission of selected facsimiles and data and for copying all documents and data passing through the interface means;
    non-alterable storage means interconnected with the interface means for storing all the information passing through the interface means; and,
    a security station for accessing the delayed and stored information, the station having means for configuring the interface means to limit the transmission/-reception of any document or data passing through the interface means, the security station being interconnected with the interface means for controlling the transmission or reception of facsimiles and data passing through the interface means, and with the storage means for accessing the information copied on the storage means.

2. The security system of claim 1 wherein the interface means is a computer processing unit.

3. The security system of claim 1 wherein the storage means is an optical storage device.

4. The security system of claim 1 further comprising a backup storage means connected to the interface means to store a copy of all documents or data copied to the storage means.

5. The security system of claim 1 wherein the security station has a monitor for viewing information passing through the interface means.

6. The security system of claim 5 further comprising a printer connected to the security station for printing any accessed document.

7. The security system of claim 1 wherein the interface means is configured to alert the security station of a transmission from a selected source and to delay completion of the transmission pending a signal response from the security station.

8. The security system of claim 1 wherein the interface means is configured to alert the security station of a transmission occurring during selected intervals and to delay completion of the transmission pending a signal response from the security station.

9. The security system of claim 1 wherein the interface means is configured to record and store, along with a copy of the document and data passing therethrough, the origination and destination of the documents and data.

10. The security system of claim 1 further comprising at least one achieving station having means for converting paper documents to a form storable on the storage means and means for transmitting the converted document to the interface means, the interface means configured to place the document into the storage means.

11. The security system of claim 10 wherein the archiving means comprises an optical scanner connected to the interface means.

12. The security system of claim 10 wherein the archiving station further comprises means to retrieve stored documents and means to print the retrieved documents.

13. The security system of claim 12 wherein the security station has means to monitor the achieving station, the interface means configured to alert the security station of retrieval of selected information stored on the storage means and to delay retrieval pending a signal response from the security station.

14. The security system of claim 12 wherein the security station has means to monitor the achieving station, the interface means configured to alert the security station of retrieval of information stored on the storage means during selected intervals, and to delay retrieval pending a signal response from the security station.

15. The security system of claim 1 further comprising facsimile modem means integral with the interface means for accepting data transmissions and converting them to facsimile transmittable form and, passing the converted information through the interface means to the external termination panel.

16. A method for providing a facsimile and data security system comprises:

providing interface means at a telephone line junction, the junction being the interconnecting point where all facsimile and data transmissions to be monitored are sent or received, the interface means disposed between a first terminal panel which connects with the external telephone and data transmission lines and a second termination panel which connects with the internal telephone and data transmission lines;

configuring the interface means for monitoring communication between external and internal facsimile and data receipt and transmission devices passing therethrough;

configuring the interface means for delaying transmission of selected facsimiles and data;

copying all documents and data passing through the interface means;

providing non-alterable storage means interconnected with the interface means for storing all the copied documents and data passing through the interface means and, providing a security station for accessing the delayed and stored information, the station having means for configuring the interface means to limit the transmission/reception of any document or data passing through the interface means, the security station being interconnected with the interface means for controlling the transmission or reception of facsimiles and data passing through the interface means, and with the storage means for accessing the information copied on the storage means.

* * * * *